United States Patent
Hashimoto et al.

(10) Patent No.: US 10,651,495 B2
(45) Date of Patent: May 12, 2020

(54) FUEL CELL STACK

(71) Applicants: Keiji Hashimoto, Nagakute (JP); Satoshi Futami, Toyota (JP); Kousuke Kawajiri, Okazaki (JP); Nobuaki Nonoyama, Susono (JP)

(72) Inventors: Keiji Hashimoto, Nagakute (JP); Satoshi Futami, Toyota (JP); Kousuke Kawajiri, Okazaki (JP); Nobuaki Nonoyama, Susono (JP)

(73) Assignees: TOYOTA SHATAI KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 188 days.

(21) Appl. No.: 14/707,838

(22) Filed: May 8, 2015

(65) Prior Publication Data
US 2016/0064766 A1 Mar. 3, 2016

(30) Foreign Application Priority Data

Aug. 29, 2014 (JP) .................................. 2014-175434

(51) Int. Cl.
| | | |
|---|---|---|
| *H01M 8/2485* | (2016.01) | |
| *H01M 8/0247* | (2016.01) | |
| *H01M 8/0206* | (2016.01) | |
| *H01M 8/0232* | (2016.01) | |

(Continued)

(52) U.S. Cl.
CPC ....... *H01M 8/2485* (2013.01); *H01M 8/0206* (2013.01); *H01M 8/0232* (2013.01); *H01M 8/0247* (2013.01); *H01M 8/0276* (2013.01); *H01M 8/24* (2013.01); *Y02P 70/56* (2015.11)

(58) Field of Classification Search
None
See application file for complete search history.

(56) References Cited

U.S. PATENT DOCUMENTS

2005/0064270 A1* 3/2005 Marianowski ...... H01M 8/0206
429/434

FOREIGN PATENT DOCUMENTS

| JP | 2004-311254 A | 11/2004 |
|---|---|---|
| JP | 2004-342493 | 12/2004 |
| JP | 2005-197086 A | 7/2005 |

(Continued)

OTHER PUBLICATIONS

Japanese Office Action for Application No. 2014-175434, dated Jun. 21, 2017 (Japanese Office Action—3 pgs.; English Language Translation—3 pgs) 6 pgs total.

*Primary Examiner* — Haixia Zhang
(74) *Attorney, Agent, or Firm* — Patterson Thuente Pedersen, P.A.

(57) ABSTRACT

A fuel cell includes a first separator and a second separator. A second protrusion is formed on a first sealing portion of the first separator. A concave portion is formed in a second sealing portion of the second separator. When fuel cells are stacked together sequentially in the vertical direction without displacing relative to one another, the center of the second protrusion and the center of the concave portion are aligned with each other. Even if the fuel cells are displaced while being stacked together, the upper fuel cell in the vertical direction is moved to decrease the distance between the center of the second protrusion and the center of the corresponding concave portion.

5 Claims, 5 Drawing Sheets

(51) Int. Cl.
*H01M 8/0276* (2016.01)
*H01M 8/24* (2016.01)

(56) References Cited

FOREIGN PATENT DOCUMENTS

| | | | |
|---|---|---|---|
| JP | 2013-178996 | A | 6/2006 |
| JP | 2006-278198 | A | 10/2006 |
| JP | 2006-309989 | A | 11/2006 |
| JP | 2006-156131 | A | 9/2013 |

\* cited by examiner

FUEL CELL STACK

RELATED APPLICATIONS

This present application claims priority to Japanese Patent Application No. 2014-175434 filed Aug. 29, 2014, said priority application being fully incorporated herein by reference in its entirety.

FIELD OF THE INVENTION

The present invention relates to a fuel cell stack having a plurality of fuel cells stacked together. Each of the fuel cells includes a membrane electrode assembly and a pair of first and second separators, which are arranged on opposite sides of the membrane electrode assembly.

BACKGROUND OF THE INVENTION

This type of fuel cell stack has a sealing structure for preventing leakage of reactive gas and coolant to the exterior of the fuel cell stack. In the technique described in Japanese Laid-Open Patent Publication No. 2004-342493, a pair of separators is formed by pressing thin plate-like metal members. A protrusion is formed on the first separator out of the two separators through pressing to provide the sealing structure. The protrusion of the first separator is brought into contact with a flat surface of the second separator. Since the protrusion is formed by a thin plate-like metal member, the protrusion is elastic. Therefore, as described in the aforementioned document, sealing performance is obtained by applying load to the first and second separators while maintaining contact between the flat surface of the second separator and the protrusion of the first separator.

The above-described fuel cell stack is required to minimize displacement between fuel cells when the fuel cells are stacked together. If such displacement is large, components such as the separators move to an unexpected extent when load is applied to the fuel cells. This deforms gas passages and thus increases pressure loss of the reactive gas. As a result, power generation performance and sealing performance may decrease.

To restrain such displacement to an acceptable range, positioning pins may be employed in a step of stacking fuel cells together. This may complicate the equipment and operations needed in the manufacturing steps.

SUMMARY OF THE INVENTION

To solve the above-described problem, it is an objective of the present invention to provide a fuel cell stack capable of easily restraining displacement of fuel cells caused at the time of manufacturing the fuel cell stack.

Means for achieving the above objective and advantages thereof will now be discussed. To achieve the foregoing objective and in accordance with one aspect of the present invention, a fuel cell stack including a plurality of fuel cells stacked together is provided. Each of the fuel cells includes a membrane electrode assembly and a pair of first and second separators arranged on opposite sides of the membrane electrode assembly. The fuel cell stack includes a manifold including a manifold collective passage for collecting fluid for the fuel cells and a manifold branch passage branching from the manifold collective passage. The first separator and the second separator each include an opening for configuring the manifold collective passage. The first separator includes a first sealing portion for sealing the manifold collective passage. The second separator includes a second sealing portion for sealing the manifold collective passage. The first sealing portion includes a protrusion. The second sealing portion includes a concave portion that has a curved shape. The fuel cell stack includes first and second fuel cells that are adjacent to each other. A distal end of the protrusion of the first fuel cell is held in contact with the concave portion of the second fuel cell.

A step of stacking fuel cells together, which is one of the steps of manufacturing the fuel cell stack, includes a step of causing contact between the protrusion of the first fuel cell and the concave portion of the second fuel cell, which is adjacent to the first fuel cell. When the stacking step is performed with the respective surfaces of the first and second fuel cells extended perpendicular to the vertical direction, the potential energy of the upper one of the fuel cells in the vertical direction is greater in a case in which the center of the concave portion and the center of the protrusion are offset from each other than in a case in which the center of the concave portion and the center of the protrusion are aligned. Specifically, if the protrusion is in contact with the concave portion, force that hampers movement of the protrusion relative to the concave portion is small. This facilitates the movement of the protrusion relative to the concave portion to minimize the potential energy of the upper one of the fuel cells in the vertical direction. Therefore, by minimizing the potential energy of the upper fuel cell in the vertical direction when the locations of the fuel cells are aligned, the protrusion is caused to move relative to the concave portion to decrease the potential energy. As a result, displacement between the adjacent fuel cells is reduced.

DETAILED DESCRIPTION OF THE DRAWINGS

A fuel cell stack according to one embodiment will now be described with reference to the drawings.

Figure 1:
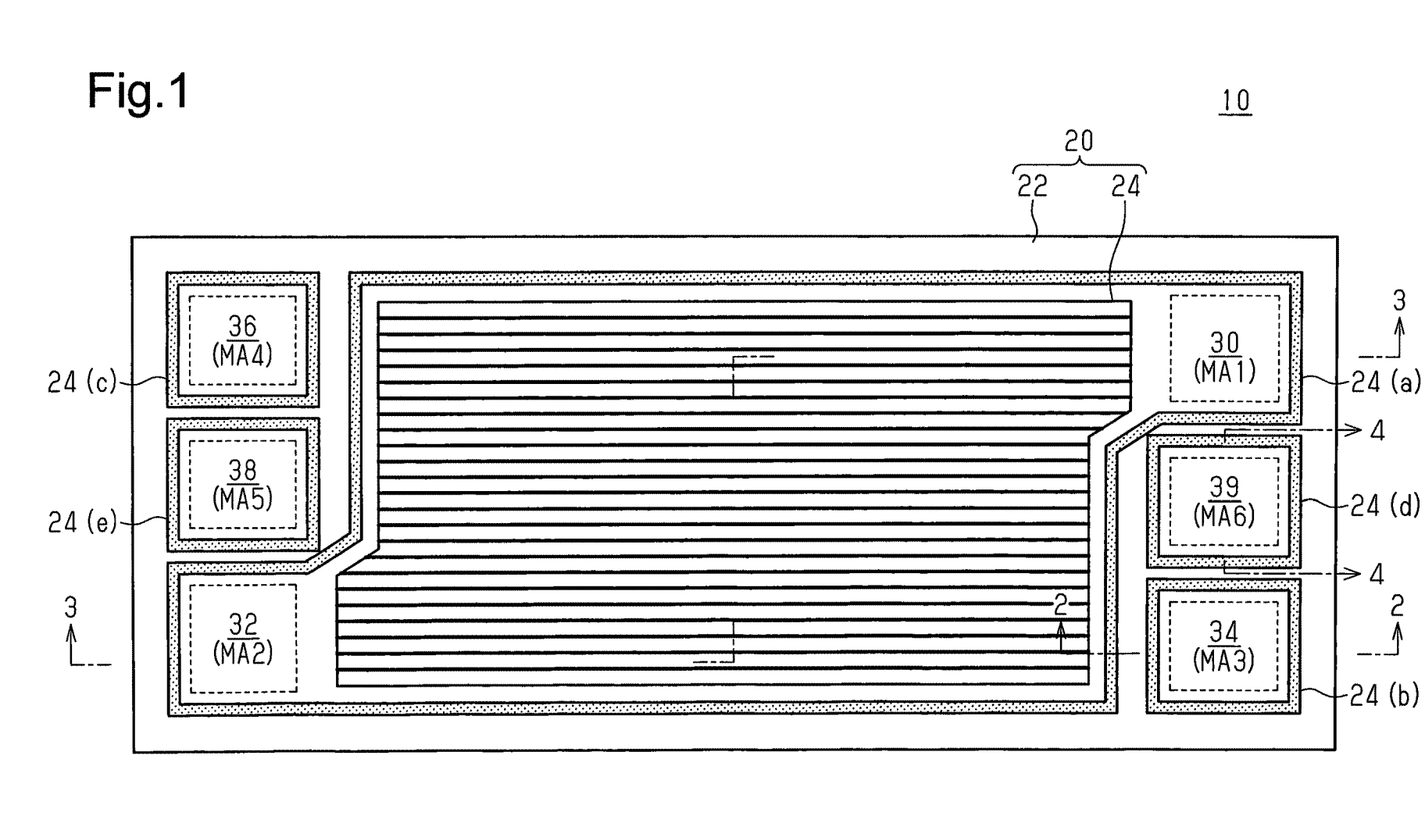
FIG. 1 is a plan view showing a fuel cell according to a first embodiment.

FIG. 1 shows a first separator 20 of a fuel cell 10, which is a component of the fuel cell stack. The first separator 20 is formed by a thin plate-like metal member. The first separator 20 includes recessed portions 22 and projections 24, which are formed through pressing, and has an uneven shape. Each of the projections 24 defines a passage for reactive gas in the fuel cell 10. The projection 24 configures a sealing structure for shielding passages for reactive gas and coolant from the exterior of the fuel cell stack.

The first separator 20 includes first to sixth openings 30, 32, 34, 36, 38, and 39, which are punched out of the thin plate-like member. The first opening 30 configures a first manifold collective passage MA1, in which coolant to be supplied to each fuel cell 10 to cool the fuel cell 10 is collected. The second opening 32 configures a second manifold collective passage MA2, in which the coolant that has been used to cool each fuel cell 10 is collected. The third opening 34 configures a third manifold collective passage MA3, in which hydrogen gas to be supplied to each fuel cell 10 is collected. The fourth opening 36 configures a fourth manifold collective passage MA4, in which hydrogen gas flowing out of each fuel cell 10 is collected. The fifth opening 38 configures a fifth manifold collective passage MA5, in which oxygen gas to be supplied to each fuel cell 10 is collected. The sixth opening 39 configures a sixth manifold collective passage MA6, in which oxygen gas flowing out of each fuel cell 10 is collected.

Figure 2:
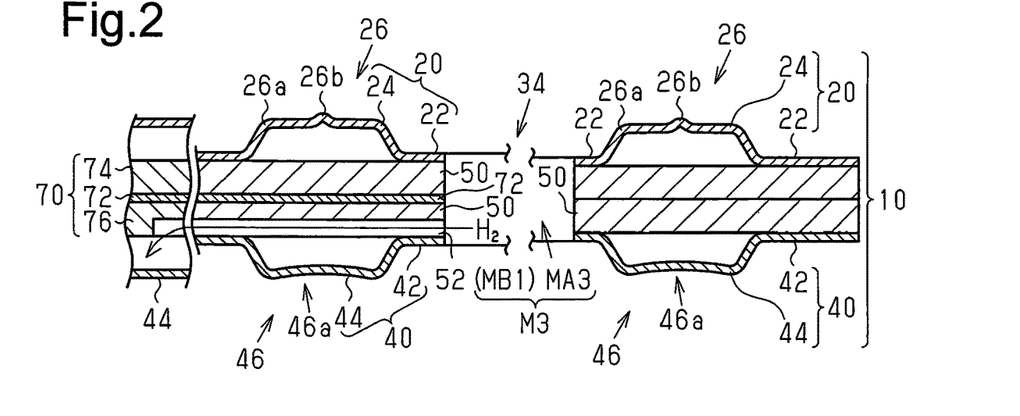
FIG. 2 is a cross-sectional view taken along line 2-2 of the cell illustrated in FIG. 1.

As shown in FIG. 2, each fuel cell 10 includes the first separator 20, a second separator 40, frames 50, and a membrane electrode assembly 70.

The second separator 40 is formed by a thin plate-like metal member. The second separator 40 includes recessed portions 42 and projections 44, which are formed through pressing, and has an uneven shape. Each of the projections 44 defines a passage for reactive gas in the fuel cell 10. The projection 44 configures a sealing structure for shielding passages for reactive gas and coolant from the exterior of the fuel cell stack. The second separator 40 includes first to sixth openings 30, 32, 34, 36, 38, and 39, each of which is formed by punching a portion out of the thin plate-like member.

The membrane electrode assembly 70 includes an electrolyte membrane 72, which is a solid polymeric membrane, and a pair of electrodes 74, 76, which are arranged on the opposite sides of the electrolyte membrane 72. In the present embodiment, a solid polymer fuel cell is illustrated as each of the fuel cells 10. The membrane electrode assembly 70 is connected to the frames 50. Specifically, in the present embodiment, end portions of the electrolyte membrane 72 are clamped between the frames 50 so that the electrolyte membrane 72 is connected to the frames 50. Specifically, as illustrated in FIG. 2, the electrolyte membrane 72 is clamped between the frames 50 at the left side of the third opening 34 as viewed in the drawing but the electrolyte membrane 72 does not exist at the right side of the third opening 34. The third opening 34 is formed also in each of the frames 50.

The periphery of the third opening 34 in the second separator 40 forms the corresponding recessed portions 42. Each of the recessed portions 42 is held in contact with the corresponding one of the frames 50. The recessed portions 42 and the frames 50 seal the third manifold collective passage MA3 from the interior of the fuel cell 10. However, the portion of the periphery of the third opening 34 in the second separator 40 corresponding to the portion on the left side as viewed in FIG. 2 faces a groove portion 52, which is formed in the corresponding frame 50. The groove portion 52 is formed by cutting the frame 50 to decrease the thickness of the frame 50. In this configuration, as represented by the arrow in FIG. 2, hydrogen gas flows from inside the third manifold collective passage MA3, which is configured by the third opening 34, into the space defined by the membrane electrode assembly 70 and the projection 44 via the groove portion 52.

In the present embodiment, the groove portion 52 configures a first manifold branch passage MB1 for distributing the hydrogen gas to the respective fuel cells 10. A manifold M3 is formed to include the third manifold collective passage MA3 and the first manifold branch passage MB1. A non-illustrated fourth manifold M4 is formed to include the fourth manifold collective passage MA4 and the first manifold branch passage MB1. Typically, a manifold M including a manifold collective passage MA and a manifold branch passage MB collects fluid for the fuel cells 10 and forms a branch for the fluid for the fuel cells 10, respectively. The periphery of the third opening 34 in the first separator 20 forms the corresponding recessed portions 22. Each of the recessed portions 22 is held in contact with the corresponding one of the frames 50. The recessed portions 22 and the frames 50 seal the interior of the fuel cell 10 from the third manifold collective passage MA3, which is configured by the third opening 34. The frame 50 on the side corresponding to the first separator 20 lacks a groove portion 52, which would otherwise be formed in the vicinity of the third opening 34. This corresponds to the fact that, in the present embodiment, the hydrogen gas is allowed to flow between the second separator 40 and the corresponding frame 50 and between the membrane electrode assembly 70 and the second separator 40, but neither between the first separator 20 and the corresponding frame 50 nor between the membrane electrode assembly 70 and the first separator 20. In the reference numerals 10(1) and 10(2) representing the fuel cells 10 in FIG. 3, the numerals (1) and (2) are used to identify the adjacent fuel cells 10. That is, the adjacent fuel cells 10 are a first fuel cell 10(1) and a second fuel cell 10(2). The same applies to FIGS. 6A to 6C.

Figure 3:
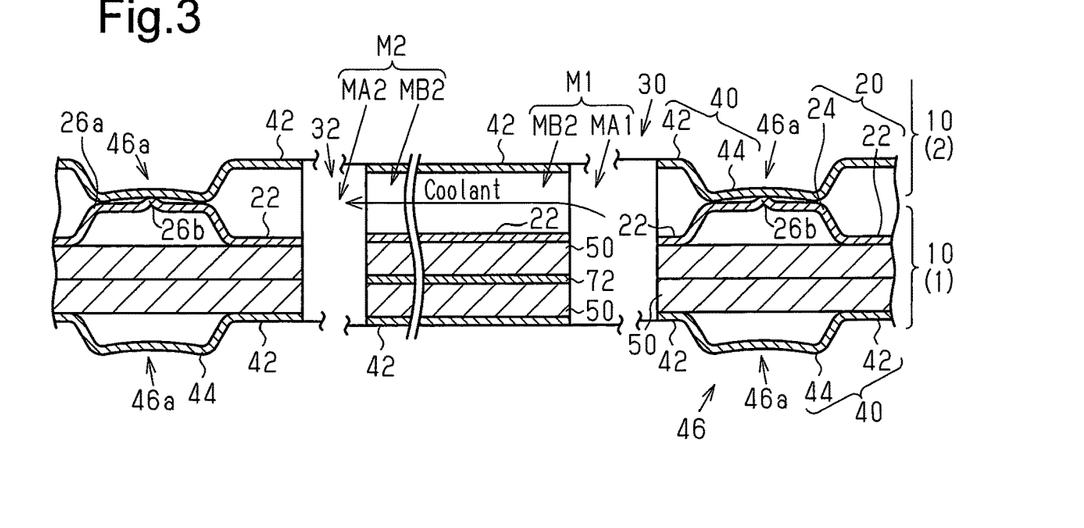
FIG. 3 is a cross-sectional view taken along line 3-3 of FIG. 1, with a second separator of a cell adjacent to the cell of FIG. 1 illustrated together.

As shown in FIG. 3, a recessed portion 22 is formed in each of the periphery of the first opening 30 and the periphery of the second opening 32 in the first separator 20. Each of the recessed portions 22 at the first and second openings 30, 32 is held in contact with the corresponding one of the frames 50. The recessed portions 22 and the frames 55 thus seal the interior of the fuel cell 10(1) from the corresponding first and second manifold collective passages MA1, MA2, which are configured by the corresponding first and second openings 30, 32.

A recessed portion 42 is formed in each of the periphery of the first opening 30 and the periphery of the second opening 32 in the second separator 40. Each of the recessed portions 42 is held in contact with the corresponding one of the frames 50. The recessed portions 42 and the frames 50 seal the interior of the fuel cell 10(1) from the corresponding first and second manifold collective passages MA1, MA2, which are configured by the corresponding first and second openings 30, 32.

The first separator 20 of the first fuel cell 10(1), which is one of the two adjacent fuel cells 10, is overlapped with the second separator 40 of the second fuel cell 10(2), which is the other one of the fuel cells 10. In this manner, a passage for coolant is formed. That is, referring to FIG. 3, the space defined by the recessed portion 22 located leftward of the first opening 30 in the first separator 20 of the first fuel cell 10(1) and the second separator 40 of the second fuel cell 10(2) defines a second manifold branch passage MB2. The second manifold branch passage MB2 distributes the coolant from the first manifold collective passage MA1, which is configured by the first opening 30, to the respective fuel cells 10. The coolant that has been used to cool the respective fuel cells 10 is collected in the second manifold collective passage MA2, which is configured by the second opening 32, through the second manifold branch passage MB2. A first manifold M1 is formed to include the first manifold collective passage MA1 and the second manifold branch passage MB2. A second manifold M2 is formed to include the second manifold collective passage MA2 and the second manifold branch passage MB2. The fuel cells cooled by the coolant distributed by the second manifold branch passage MB2 are the two adjacent first and second fuel cells 10(1), 10(2), which define the second manifold branch passage MB2. In FIG. 3, only the second separator 40 is illustrated for the second fuel cell 10(2).

Figure 4:
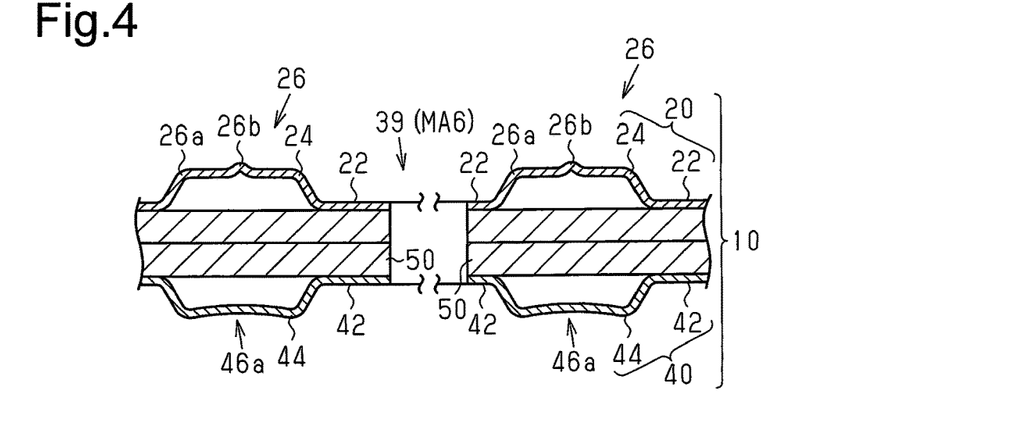
FIG. 4 is a cross-sectional view taken along line 4-4 of the cell of FIG. 1.

As illustrated in FIG. 4, the periphery of the sixth opening 39 in the first separator 20 forms the corresponding recessed portions 22. Each of the recessed portions 22 is held in contact with the corresponding one of the frames 50. The recessed portions 22 and the frames 50 seal the interior of the fuel cell 10 from the sixth manifold collective passage MA6, which is configured by the sixth opening 39.

The periphery of the sixth opening 39 in the second separator 40 forms the corresponding recessed portions 42. Each of the recessed portions 42 is held in contact with the corresponding one of the frames 50. The recessed portions 42 and the frames 50 seal the interior of the fuel cell 10 from the sixth manifold collective passage MA6, which is configured by the sixth opening 39.

The portion of the periphery of the first separator 20 corresponding to the left side of the sixth opening 39 illustrated in FIG. 1 opposes a groove portion 52, which is similar to the groove portion 52 illustrated in FIG. 2. This corresponds to the fact that, in the present embodiment, the oxygen gas is allowed to flow between the first separator 20 and the corresponding frame 50 and between the membrane electrode assembly 70 and the first separator 20, but neither between the second separator 40 and the corresponding frame 50 nor between the membrane electrode assembly 70 and the second separator 40. The groove portion 52 in which the oxygen gas flows forms a non-illustrated third manifold branch passage MB3. A non-illustrated fifth manifold M5 is formed to include the fifth manifold collective passage MA5 and the third manifold branch passage MB3. Also, a non-illustrated sixth manifold M6 is formed to include the sixth manifold collective passage MA6 and the third manifold branch passage MB3.

The shape of the second separator 40 is a mirror image of the shape of the first separator 20, which is illustrated in FIG. 1. For example, the periphery of the third opening 34 in the second separator 40, which is illustrated in FIG. 2, corresponds to the periphery of the third opening 34 in the first separator 20, which is illustrated in FIG. 1. The periphery of the first opening 30 in the second separator 40, which is illustrated in FIG. 3, corresponds to the periphery of the first opening 30 in the first separator 20, which is illustrated in FIG. 1.

Those of the projections 24 of the first separator 20 surrounding the first to sixth openings 30, 32, 34, 36, 38, and 39 each configure a first sealing portion 26. Those of the projections 44 of the second separator 40 surrounding the first to sixth openings 30, 32, 34, 36, 38, and 39 each configure a second sealing portion 46. The first sealing portions 26 and the second sealing portions 46 seal the first to sixth manifold collective passages MA1 to MA6 from the exterior. In FIG. 1, the projections 24 configuring the first sealing portions 26 are represented by dotted zones to be distinguished from the other projections 24, which are represented by solid lines. The reference indices (a) to (e) are added to the reference numerals representing the projections 24 configuring the first sealing portions 26 to identify the sealing targets, which are the first to sixth manifold collective passages MA1 to MA6. The projection 24(a) seals the first and second manifold collective passages MA1, MA2, which are configured by the corresponding first and second openings 30, 32, from the exterior of the fuel cell stack. Each of the projections 24(b) to 24(e) seals the corresponding one of the third to sixth manifold collective passages MA3 to MA6, which is configured by the corresponding third to sixth openings 34, 36, 38, and 39, from the exterior of the fuel cell stack.

FIG. 1 schematically illustrates the passages for reactive gas defined by the projections 24. The passages for reactive gas may be shaped in any other suitable manner. It is desirable to provide a portion with a decreased projecting amount compared to other portions in each of the projections 24 that do not configure a sealing portion and the opposed one of the projections 44, so that coolant is allowed to flow in a middle portion as viewed in FIG. 1.

With reference to FIGS. 2, 3, and 4, each of the first sealing portions 26 has a second protrusion 26b formed on a middle portion of a first protrusion 26a, which is formed by the corresponding one of the projections 24. Each of the second sealing portions 46 is configured by a concave portion 46a, which is a curved top surface of the corresponding one of the projections 44.

Figure 5A:
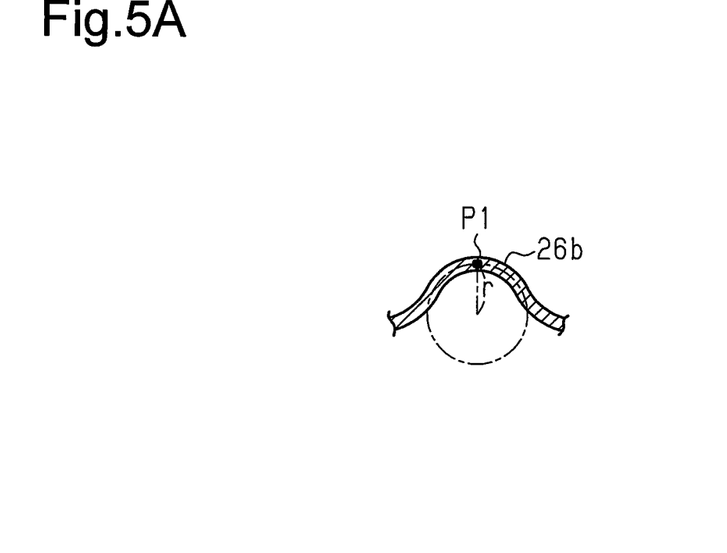
FIG. 5A is a cross-sectional view showing a protrusion.

As shown in FIG. 5A, the second protrusion 26b is formed by pressing a plate-like metal member and has an arcuate cross section. As is clear from FIGS. 2 to 4, the cross section illustrated in FIG. 5A extends perpendicular to the direction in which the projection 24 extends. For example, the cross section illustrated in FIG. 5A is a cross section extending parallel to the longitudinal direction of the first separator 20 in the portions of the projection 24(d) of FIG. 1 that extends in the transverse direction of the first separator 20. The cross section of FIG. 5A is a cross section extending parallel to the transverse direction of the first separator 20 in the portions of the projection 24(d) that extend in the longitudinal direction of the first separator 20. FIG. 5A represents a first radius of curvature r by which a center P1 of a distal end portion of the second protrusion 26b is defined. The center P1 represents the position in the second protrusion 26b that is most spaced from the plane including the frames 50 and the membrane electrode assembly 70 (the plane perpendicular to the vertical direction as viewed in FIG. 2).

Figure 5B:
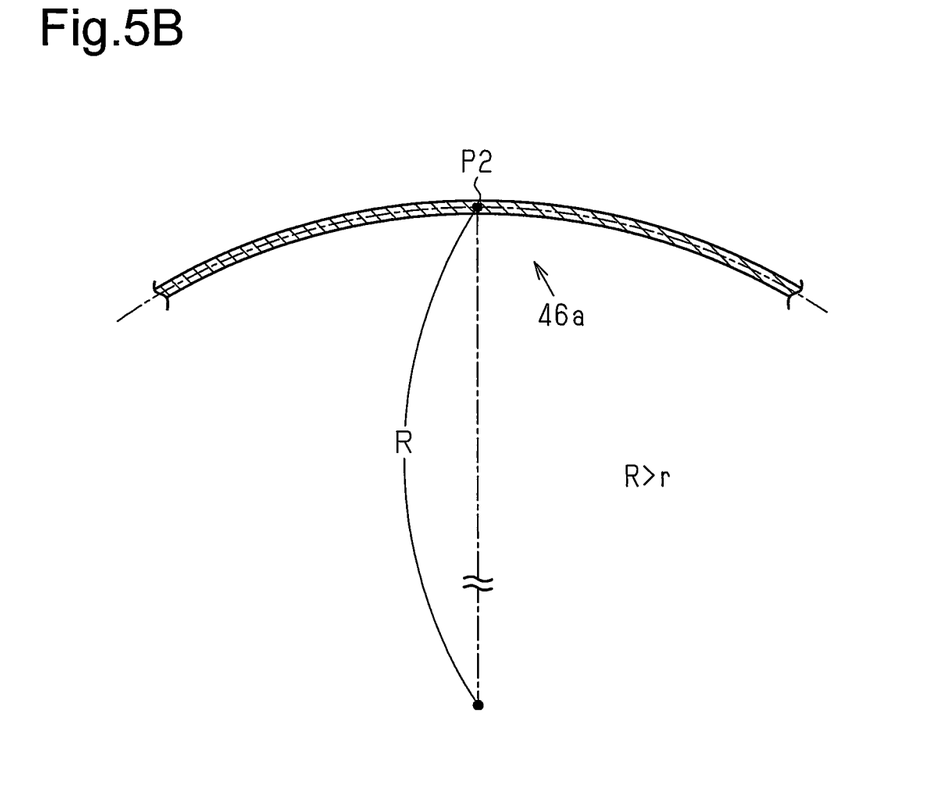
FIG. 5B is a cross-sectional view showing a concave portion.

With reference to FIG. 5B, the concave portion 46a is a round and formed by pressing a plate-like metal member. As is clear from FIGS. 2 to 4, the cross section illustrated in FIG. 5B is a cross section extending perpendicular to the direction in which the projection 44 extends. FIG. 5B represents a second radius of curvature R by which a center P2 of a distal end portion of the concave portion 46a is defined. The center P2 corresponds to the position in the concave portion 46a closest to the plane including the frames 50 and the membrane electrode assembly 70. It is desired that the radius of curvature be substantially constant in a substantially whole area of the concave portion 46a except for end portions of the concave portion 46a.

In the present embodiment, the second radius of curvature R is set to a value greater than the first radius of curvature r. Further, the fuel cell stack is designed such that, when the positions of the fuel cells 10 configuring the fuel cell stack are aligned, the center P1 of the second protrusion 26b is aligned with the center P2 of the concave portion 46a.

Figure 6A:
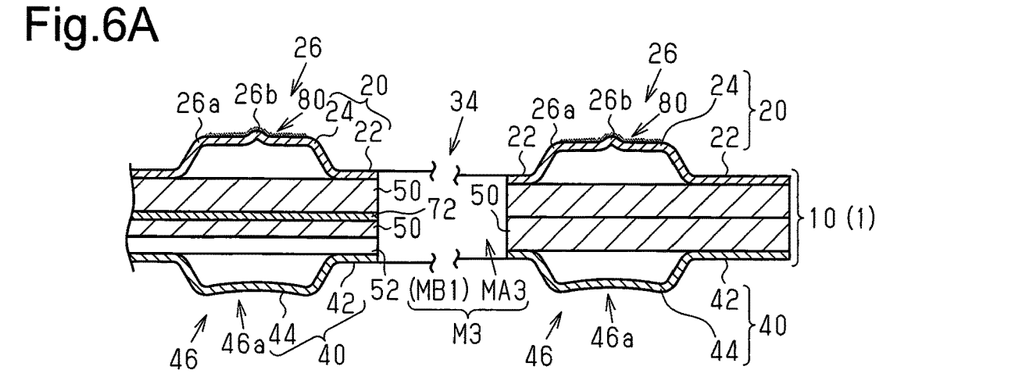
FIGS. 6A, 6B, and 6C are cross-sectional views illustrating a series of manufacturing steps of a fuel cell stack.
Figure 6B:
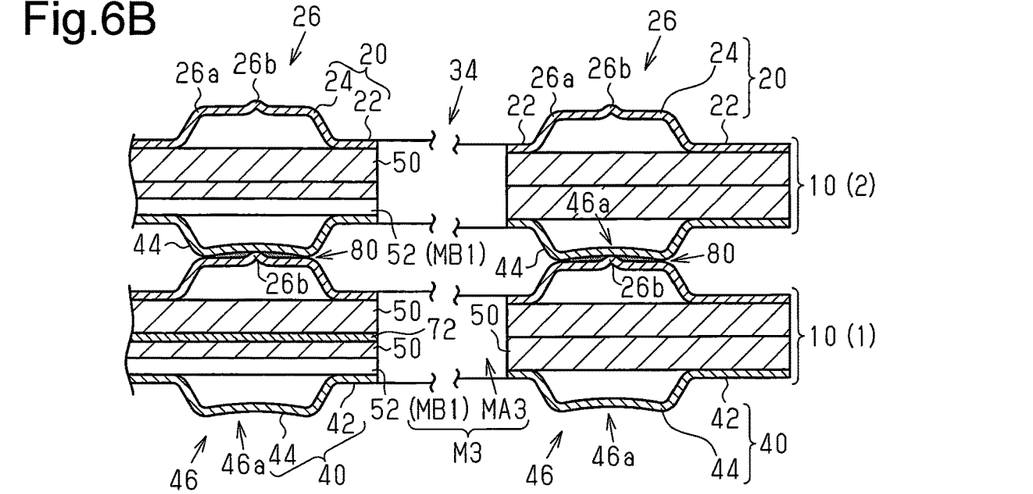
Figure 6C:
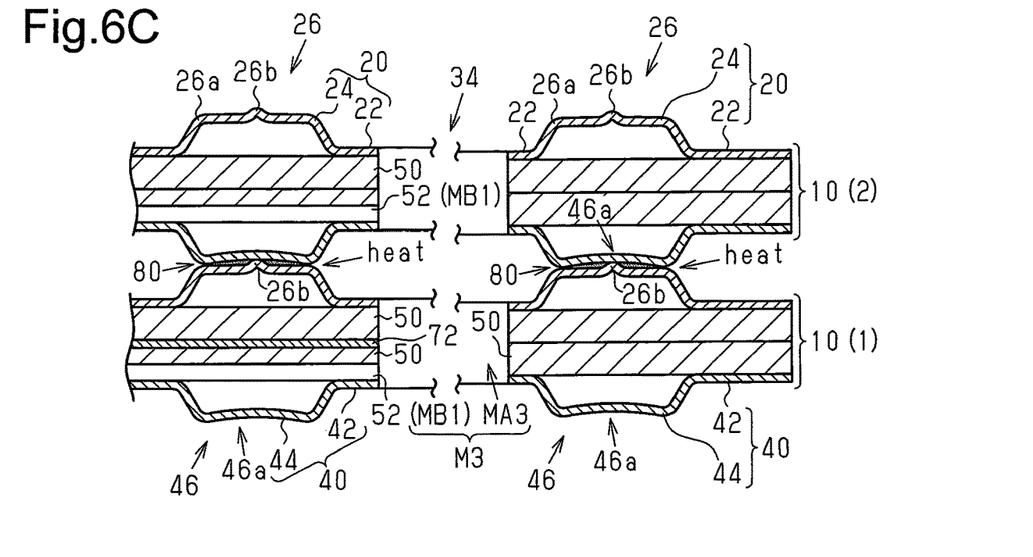

FIGS. 6A to 6C represent steps of manufacturing the fuel cell stack according to the present embodiment. The upper sides of the drawings each represent an upper side in the vertical direction.

FIG. 6A represents a step of applying a thermosetting adhesive 80 onto the second protrusion 26b of the first fuel cell 10(1). FIG. 6B represents a step of stacking the second fuel cell 10(2) on the first fuel cell 10(1), which has the second protrusion 26b onto which the adhesive 80 has been applied. The second protrusion 26b is formed on the first protrusion 26a, which is the projection 24. Therefore, in the stacking step, before those of the projections 24 of the first separator 20 that do not configure the first sealing portions 26 come into contact with those of the projections 44 of the second separator 40 that do not configure the second sealing portions 46, the second sealing portions 46 of the second fuel cell 10(2) come into contact with the first sealing portions 26 of the first fuel cell 10(1). That is, the concave portions 46a first come into contact with the second protrusions 26b. Then, when those of the projections 24 of the first separator 20 that do not configure the first sealing portions 26 come into contact with those of the projections 44 of the second separator 40 that do not configure the second sealing portions 46, each concave portion 46a and the corresponding second protrusion 26b apply action-reaction forces to each other. The forces applied by the concave portion 46a and the second protrusion 26b to each other are more intense than the forces acting on the portions other than the concave portion 46a and the second protrusion 26b. Contact between each concave portion 46a of the second fuel cell 10(2) and the corresponding second protrusion 26b of the first fuel cell 10(1) may be brought about indirectly through the adhesive 80. Alternatively, by causing direct contact between the concave portion 46a and the second protrusion 26b using the action-reaction forces applied by the concave portion 46a and the second protrusion 26b to each other, the adhesive 80 may be caused to adhere to an area around the concave portion 46a and the second protrusion 26b.

FIG. 6C represents a heating step of heating the adhesive 80 performed on the stacked first and second fuel cells 10(1), 10(2). By setting the adhesive 80 in the heating step, the second protrusion 26b and the concave portion 46a are fixed to each other through the adhesive 80. It is desired that the fuel cell stack be installed in a vehicle such that the normal direction of the surface of the first separator 20 illustrated in FIG. 1 coincides with the horizontal direction.

Operation of the present embodiment will now be described with reference to FIGS. 7A and 7B.

Figure 7A:
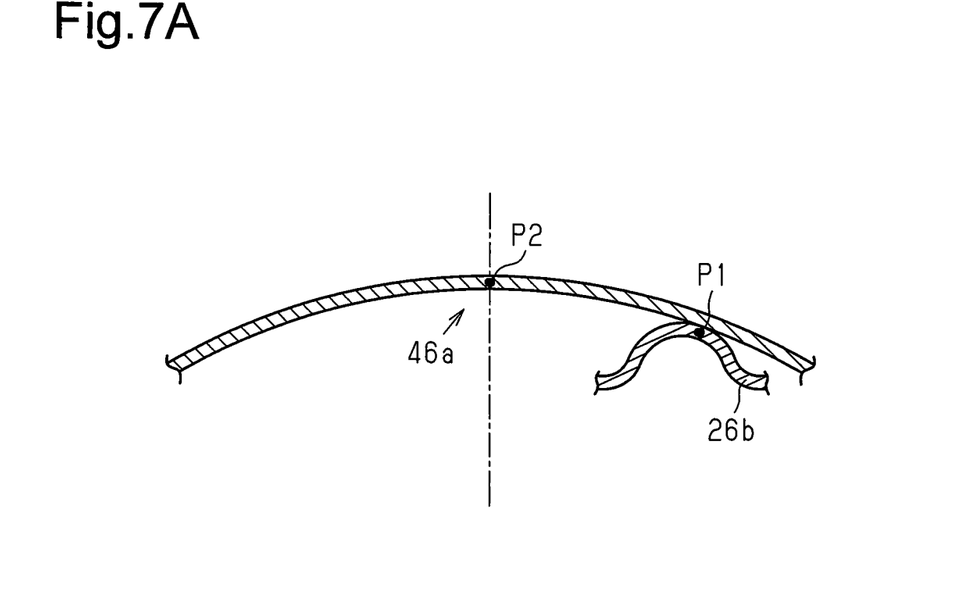
FIGS. 7A and 7B are cross-sectional views representing operation of the embodiment illustrated in FIG. 1.
Figure 7B:
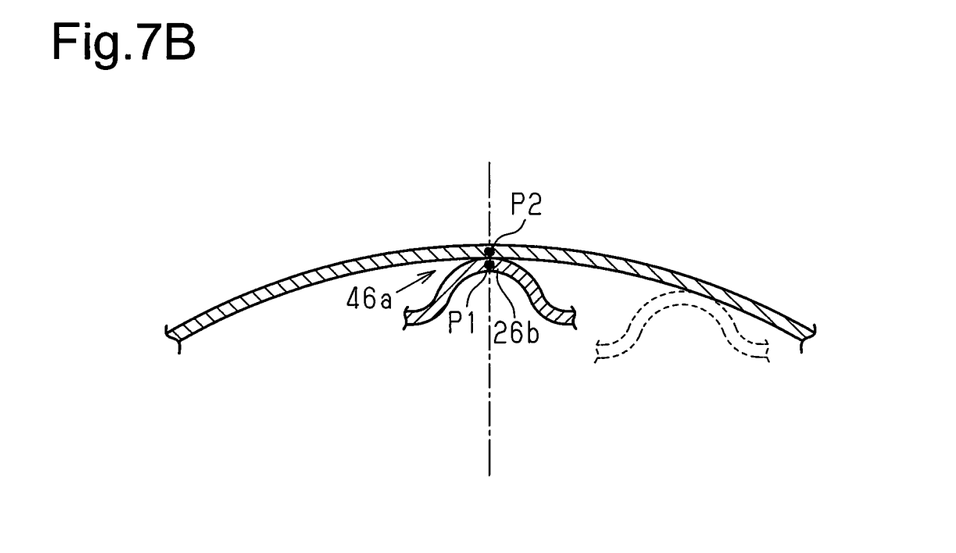

FIG. 7A illustrates a state in which the center P1 of the second protrusion 26b of the first fuel cell 10(1) is offset from the center P2 of the concave portion 46a of the second fuel cell 10(2) in the stacking step represented in FIG. 6B. In this case, potential energy of the second fuel cell 10(2) illustrated in FIG. 6B is greater than that in a case in which the center P1 of the second protrusion 26b is aligned with the center P2 of the concave portion 46a. Specifically, the second protrusion 26b and the concave portion 46a both have a smooth surface. Force that hampers movement of the concave portion 46a relative to the second protrusion 26b for decreasing the potential energy of the second fuel cell 10(2) is thus small. This facilitates the movement of the concave portion 46a relative to the second protrusion 26b to decrease the potential energy of the second fuel cell 10(2). As a result, referring to FIG. 7B, the offset amount between the center P1 of the second protrusion 26b of the first fuel cell 10(1) and the center P2 of the concave portion 46a of the second fuel cell 10(2) is readily decreased.

Such decrease in the offset amount happens in two directions (which are, for example, the longitudinal direction and the transverse direction of the first separator 20) perpendicular to each other on the plane on which the first separator 20 extends as illustrated in FIG. 1. That is, the cross-sectional shape of the second protrusion 26b illustrated in FIG. 5A is the shape of a cross section extending perpendicular to the extending direction of the projection 24. The cross-sectional shape of the concave portion 46a illustrated in FIG. 5B is the shape of a cross section extending perpendicular to the extending direction of the projection 44.

The projection 24 having the second protrusion 26b and the projection 44 having the concave portion 46a extend in the longitudinal direction and the transverse direction of the first separator 20. The second protrusion 26b thus moves relative to the concave portion 46a in both the longitudinal direction and the transverse direction of the first separator 20. Specifically, in the portions illustrated in FIGS. 2 and 3, the direction of movement of the second protrusion 26b relative to the concave portion 46a corresponds to the longitudinal direction of the first separator 20. In the portion illustrated in FIG. 4, the direction of movement of the second protrusion 26b relative to the concave portion 46a corresponds to the transverse direction of the first separator 20.

The above described embodiment achieves the following advantages.

(1) Each first sealing portion 26 of the first separator 20 has the second protrusion 26b, and the corresponding second sealing portion 46 of the second separator 40 has the concave portion 46a. This easily restrains displacement between the fuel cells 10.

(2) Each projection 44 of the second separator 40 has the concave portion 46a. In this configuration, the surface of the second sealing portion 46 corresponding to the inner side of the fuel cell 10 is separate from the corresponding frame 50. This facilitates elastic deformation of the concave portion 46a when the second protrusion 26b and the concave portion 46a apply action-reaction forces to each other.

(3) As illustrated in FIG. 1, the portion of the first separator 20 between the projection 24(e) and the projection 24(d), each of which configures the first sealing portion 26, faces the membrane electrode assembly 70 illustrated in FIG. 2. Also, the portion between the parts of the projection 24(a) extending along the long sides of the first separator 20 face the membrane electrode assembly 70. That is, the first sealing portions 26 are formed on the opposite sides of the surface of the first separator 20 facing the membrane electrode assembly 70. The second sealing portions 46 are formed on the opposite sides of the surface of the second separator 40 facing the membrane electrode assembly 70. In this configuration, if the first fuel cell 10(1) and the second fuel cell 10(2) are stacked together with the centers P1, P2 located offset from each other in the stacking step, the opposite sides with the membrane electrode assembly 70 in between move in a balanced manner to decrease the offset amount between the center P1 of the first fuel cell 10(1) and the center P2 of the second fuel cell 10(2). The offset amount between the center P1 and the center P2 is thus decreased in a desired manner.

(4) The radius of curvature of each concave portion 46a (the second radius of curvature R) is set to a value greater than the radius of curvature of each second protrusion 26b (the first radius of curvature r). This restrains, in a desired manner, generation of force that hampers movement of the second protrusion 26b on and relative to the concave portion 46a due to the shapes of the second protrusion 26b and the concave portion 46a.

(5) The first separator 20 and the second separator 40 are each formed by a metal separator formed through pressing. In this configuration, the characteristics of the thin plate-like metal members facilitate elastic deformation of the first separator 20 and the second separator 40. Therefore, the gap between each first sealing portion 26 and the corresponding second sealing portion 46 is reduced in size by action-reaction forces applied by the first sealing portion 26 and the second sealing portion 46 to each other. As a result, a sealing structure is ensured.

(6) The second protrusions 26b are formed on the first protrusions 26a of the projections 24. Since each recessed portion 22 is held in contact with the corresponding frame 50, the recessed portion 22 cannot easily move toward the frame 50. In contrast, each projection 24 is separate from the corresponding frame 50 and thus easily moves toward the frame 50. Therefore, using action-reaction forces applied by the first sealing portion 26 and the second sealing portion 46 to each other, the second protrusion 26b readily moves in the direction in which force is applied by the concave portion 46a.

(7) Each second protrusion 26b and the corresponding concave portion 46a are bonded together by setting the adhesive following the stacking step. Therefore, the adhesive 80 does not hamper movement of the second fuel cell 10(2) for decreasing the offset amount between the center P1 of the second protrusion 26b and the center P2 of the concave portion 46a.

Other Embodiments

The above illustrated embodiment may be modified as follows.

Regarding Protrusions

In the above illustrated embodiment, the second protrusions 26b are used as sealing structures for the fifth and sixth manifold collective passages MA5, MA6 (the fifth and sixth openings 38, 39) for oxygen gas, sealing structures for the third and fourth manifold collective passages MA3, MA4 (the third and fourth openings 34, 36) for hydrogen gas, and sealing structures for the first and second manifold collective passages MA1, MA2 (the first and second openings 30, 32) for coolant. However, the sealing structures are not restricted to the second protrusions 26b. For example, the second protrusions 26b may be formed only on the projections 24(a), 24(b), 24(c), which are illustrated in FIG. 1, and not on the projections 24(d) and 24(e) of FIG. 1. Alternatively, the second protrusions 26b may be formed only on the projections 24(b), 24(c) of FIG. 1. Also, in these cases, the fuel cells 10 are expected to move to decrease the offset amount between the center P2 (see FIG. 7) of each concave portion 46a and the center P1 of the corresponding second protrusion 26b. Employing the second protrusions 26b is thus effective in restraining displacement between the fuel cells 10.

In the above illustrated embodiment, the first radius of curvature r of the distal end portion of each second protrusion 26b is set to a value smaller than the second radius of curvature R of each concave portion 46a. However, the present invention is not restricted to this. For example, even when each second protrusion 26b has a trapezoidal cross section instead of the cross section illustrated in FIG. 5A, it is expected that the fuel cells 10 will move to decrease the offset amount between the center P2 of the concave portion 46a and the center P1 of the second protrusion 26b as long as the surface area of a flat portion of the distal end of the second protrusion 26b is relatively small.

The second protrusions 26b do not necessarily have to be formed on the corresponding first protrusions 26a. For example, the first protrusions 26a may be omitted and the second protrusions 26b may be formed on the recessed portions 22 of the first separator 20. In this case, the projecting amount of those of the projections 44 of the second separator 40 that configure the second sealing portions 46 is set greater than the projecting amount of the other ones of the projections 44. In this manner, the second protrusions 26b and the corresponding concave portions 46a are brought into contact in a manner similar to the manner of the above illustrated embodiment.

In the above illustrated embodiment, the second protrusions 26b are formed only in the first sealing portions 26 out of the projections 24. However, the present invention is not restricted to this. The second protrusions 26b may be formed on those of the projections 24 that do not provide a sealing structure for the first to sixth manifold collective passages MA1 to MA6.

The cross section of each second protrusion 26b, the shape of which is illustrated in FIG. 5A, does not necessarily have to include the two cross sections extending in the directions perpendicular to each other, which are the longitudinal direction and the transverse direction of the first separator 20. For example, two cross sections that have normal directions non-parallel to each other and are shaped as illustrated in FIG. 5A may be employed. In other words, when the projections 24 configuring the first sealing portions 26 extend in a plurality of directions, the directions do not necessarily have to be perpendicular to one another. Also in this case, displacement of the fuel cells 10 in the direction of the plane of the first separator 20 is restrained in a desired manner.

Regarding Concave Portions

In the above illustrated embodiment, the concave portions 46a are formed on the corresponding projections 44 of the second separator 40. However, the present invention is not restricted to this. For example, the concave portions 46a may be formed in the corresponding recessed portions 42 of the second separator 40. In this case, the projecting amount of those of the projections 24 of the first separator 20 corresponding to the first sealing portions 26 is set greater than the projecting amount of the other ones of the projections 24. The surfaces of the portions of each frame 50 corresponding to the second sealing portions 46 are cut such that the inner wall surfaces of the concave portions 46a are separate from the frame 50. In this manner, advantages similar to the advantages of the above illustrated embodiment are obtained.

The locations of the concave portions may be changed at least in correspondence with changes in the locations of the protrusions described in the "Regarding Protrusions" section.

Regarding Sealing Aid Member

Although the adhesive 80 is employed as a sealing aid member in the above illustrated embodiment, the present invention is not restricted to this. For example, rubber members may be placed on surfaces of at least the second protrusions 26b or the corresponding concave portions 46a as sealing aid members. The second protrusions 26b and the concave portions 46a are brought into contact indirectly through the rubber members. In this case, the rubber members are selected such that the friction resistance between each concave portion 46a and the corresponding second protrusion 26b in the step of stacking the fuel cells 10 has such an intensity that the fuel cells 10 are allowed to move to decrease the offset amount between the center P2 of the concave portion 46a and the center P1 of the second protrusion 26b.

Sealing aid members may be omitted as long as necessary sealing performance is ensured by forces that each second protrusion 26b and the corresponding concave portion 46a apply to each other.

Regarding Steps of Manufacturing Fuel Cell Stack

In the above illustrated embodiment, the fuel cells 10 are stacked together such that each first separator 20 is arranged above the corresponding second separator 40 in the vertical direction. However, the present invention is not restricted to this. The fuel cells 10 may be stacked together such that each second separator 40 is located above the corresponding first separator 20 in the vertical direction.

The method of restraining displacement of the fuel cells 10 relative to one another in the stacking step is not restricted to the method using movement of the fuel cells 10 for minimizing potential energy. For example, this method may be employed in combination with a positioning method. Also in this case, the number of steps of restraining the aforementioned displacement is decreased by use of the method using the movement of the fuel cells 10 for minimizing potential energy. Also, such displacement is easily restrained.

Regarding Separators

In the above illustrated embodiment, the second protrusions 26b are all formed on the first sealing portions 26 of the first separator 20, and the concave portions 46a are all formed on the second sealing portions 46 of the second separator 40. However, the present invention is not restricted to this. For example, the first sealing portions 26 sealing a specific one of the manifold collective passages MA may include the second protrusions 26b while the corresponding second sealing portions 46 have the concave portions 46a. Also, the first sealing portions 26 sealing the other ones of the manifold collective passages MA may have the concave portions 46a while the corresponding second sealing portions 46 include the second protrusions 26b. Specifically, the configuration illustrated in FIG. 2 may be employed as a configuration for sealing the third manifold collective passage MA3 corresponding to the third opening 34. Further, as a configuration for sealing the first and second manifold collective passages MA1 and MA2 corresponding to the first and second openings 30 and 32, a configuration in which the concave portions 46a are formed in the first sealing portions 26 and the second protrusions 26b are formed on the second sealing portions 46 may be employed instead of the configuration illustrated in FIG. 3.

The first separator 20 and the second separator 40 are not restricted to the thin plate-like metal members formed in uneven shapes through pressing. For example, the first separator 20 and the second separator 40 may be elastic carbon materials formed in the shapes of the above illustrated embodiment.

Regarding Passages for Fluids in Fuel Cells

In the above illustrated embodiment, each of the fifth and sixth manifold collective passages MA5, MA6 for oxygen gas is formed between the corresponding one of the first and second manifold collective passages MA1, MA2 for coolant and the associated one of the third and fourth manifold collective passages MA3, MA4 for hydrogen gas. However, the present invention is not restricted to this. For example, each of the first and second manifold collective passages MA1, MA2 for coolant may be formed between the corresponding one of the third and fourth manifold collective passages MA3, MA4 for hydrogen gas and the associated one of the fifth and sixth manifold collective passages MA5, MA6 for oxygen gas.

The first to sixth manifold collective passages MA1 to MA6, which are configured by the corresponding first to sixth openings 30, 32, 34, 36, 38, and 39, do not necessarily have to be arranged along the short sides of each fuel cell 10. At least some of the first to sixth openings 30, 32, 34, 36, 38, and 39 may be arranged along a long side of the fuel cell 10.

Regarding Fluids for Fuel Cells

Fluids for the fuel cells are not restricted to the fluids of the above illustrated embodiment. For example, air may be used as reactive gas instead of oxygen gas. Refrigerant is not restricted to coolant but may be a gas such as chlorofluorocarbon gas.

OTHER MODIFICATION

Although the end portions of the electrolyte membrane 72 of each membrane electrode assembly 70 are clamped between the frames 50 in the above illustrated embodiment, the present invention is not restricted to this.

The invention claimed is:

1. A fuel cell stack comprising a plurality of fuel cells stacked together, wherein
   each of the fuel cells includes a membrane electrode assembly and a pair of first and second separators arranged on opposite sides of the membrane electrode assembly,
   the fuel cell stack includes a manifold including a manifold collective passage for collecting fluid for the fuel cells and a manifold branch passage branching from the manifold collective passage,
   the first separator and the second separator each include an opening for configuring the manifold collective passage,
   the first separator includes a first sealing portion for sealing the manifold collective passage,
   the second separator includes a second sealing portion for sealing the manifold collective passage,
   the first sealing portion includes a protrusion,
   the protrusion includes a first portion, which extends in a first direction, and a second portion, which extends in a second direction,
   the second sealing portion includes a concave portion, which has a curved shape,
   the concave portion includes a first portion, which extends in the first direction, and a second portion, which extends in the second direction,
   the first and second separators each have a rectangular shape,
   the first direction corresponds to a longitudinal direction of the first and second separators,
   the second direction corresponds to a transverse direction of the first and second separators,
   the fuel cell stack includes first and second fuel cells that are adjacent to each other,
   a cross section of the first portion of the protrusion of the first fuel cell perpendicular to the first direction has a convex arcuate surface facing the second fuel cell, the convex arcuate surface defined by a first radius of curvature,
   a cross section of the second portion of the protrusion of the first fuel cell perpendicular to the second direction has a convex arcuate surface facing the second fuel cell, the convex arcuate surface defined by the first radius of curvature,
   a cross section of the first portion of the concave portion of the second fuel cell perpendicular to the first direction has a concave arcuate surface facing the first fuel cell, the concave arcuate surface defined by a second radius of curvature greater than the first radius of curvature,
   a cross section of the second portion of the concave portion of the second fuel cell perpendicular to the second direction has a concave arcuate surface facing the first fuel cell, the concave arcuate surface defined by the second radius of curvature,
   a distal end of the convex arcuate surface of the first portion of the protrusion of the first fuel cell is held in contact with the concave arcuate surface of the first portion of the concave portion of the second fuel cell, and a distal end of the convex arcuate surface of the second portion of the protrusion of the first fuel cell is held in contact with the concave arcuate surface of the second portion of the concave portion of the second fuel cell.

2. The fuel cell stack according to claim 1, wherein
the second sealing portion includes a projection projecting outward from the corresponding fuel cell, and a surface of the projection forms the concave portion, and
an inner wall surface of the projection is separate from members in the corresponding fuel cell.

3. The fuel cell stack according to claim 1, wherein
the opening of the first separator is one of a plurality of openings, the opening of the second separator is one of a
plurality of openings, and the manifold collective passage is one of a plurality of manifold collective passages configured by the respective openings of the first and second separators, the openings of the first separator are formed on opposite sides of a portion of the first separator that faces the membrane electrode assembly, the openings of the second separator are formed on opposite sides of a portion of the second separator that faces the membrane electrode assembly, and the first sealing portion and the second sealing portion each include parts for sealing the manifold collective passages.

4. The fuel cell stack according to claim 1, wherein the first separator and the second separator are both a metal separator formed through pressing.

5. The fuel cell stack according to claim 4, wherein
the protrusion is a first protrusion, and
the fuel cell stack further includes a plurality of second protrusions each of which is formed on the first protrusion and held in contact with corresponding the concave portion.

\* \* \* \* \*